United States Patent [19]
Fulmer

[11] Patent Number: 5,327,723
[45] Date of Patent: Jul. 12, 1994

[54] MASTER CYLINDER COMPENSATION PORTS

[75] Inventor: Keith H. Fulmer, Mishawaka, Ind.

[73] Assignee: Allied-Signal Inc., Morristown, N.J.

[21] Appl. No.: 976,239

[22] Filed: Nov. 13, 1992

[51] Int. Cl.⁵ .......................... B60T 11/20; F15B 7/10
[52] U.S. Cl. ...................................... 60/562; 60/581;
60/585; 60/592
[58] Field of Search ................. 60/562, 581, 585, 588,
60/589, 592

[56] References Cited

U.S. PATENT DOCUMENTS

| | | | |
|---|---|---|---|
| 3,030,777 | 4/1962 | Springeier | 60/588 |
| 3,646,759 | 3/1972 | Hughes et al. | |
| 3,677,606 | 7/1972 | Shutt | 303/6 C |
| 3,701,257 | 10/1972 | Gaiser | |
| 3,855,798 | 12/1974 | Spairani | 60/585 |
| 4,249,381 | 2/1981 | Gaiser | 60/562 |
| 4,307,815 | 12/1981 | Sakazume | 60/585 X |
| 4,319,456 | 3/1982 | Kubota | 60/562 |
| 5,101,945 | 4/1992 | Scott | 60/562 X |
| 5,161,375 | 11/1992 | Crumb et al. | 60/562 |

FOREIGN PATENT DOCUMENTS 819790 1/1952 Fed. Rep. of Germany .

Primary Examiner—Edward K. Look
Assistant Examiner—Hoang Nguyen
Attorney, Agent, or Firm—McCormick, Jr. Leo H.; Ken C. Decker

[57] ABSTRACT

A master cylinder having first and second compensating ports with a plurality of openings therein for rapidly allowing fluid communication between a reservoir and first and second chambers to maintain the master cylinder in a ready condition with respect to an input force in the development of pressurized fluid to effect a brake application.

8 Claims, 1 Drawing Sheet

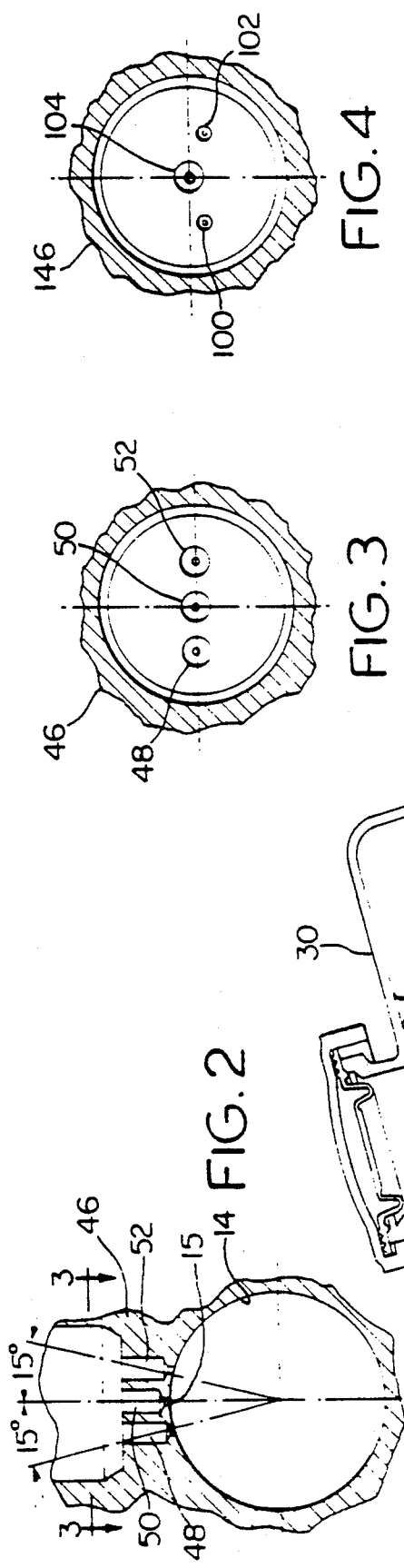
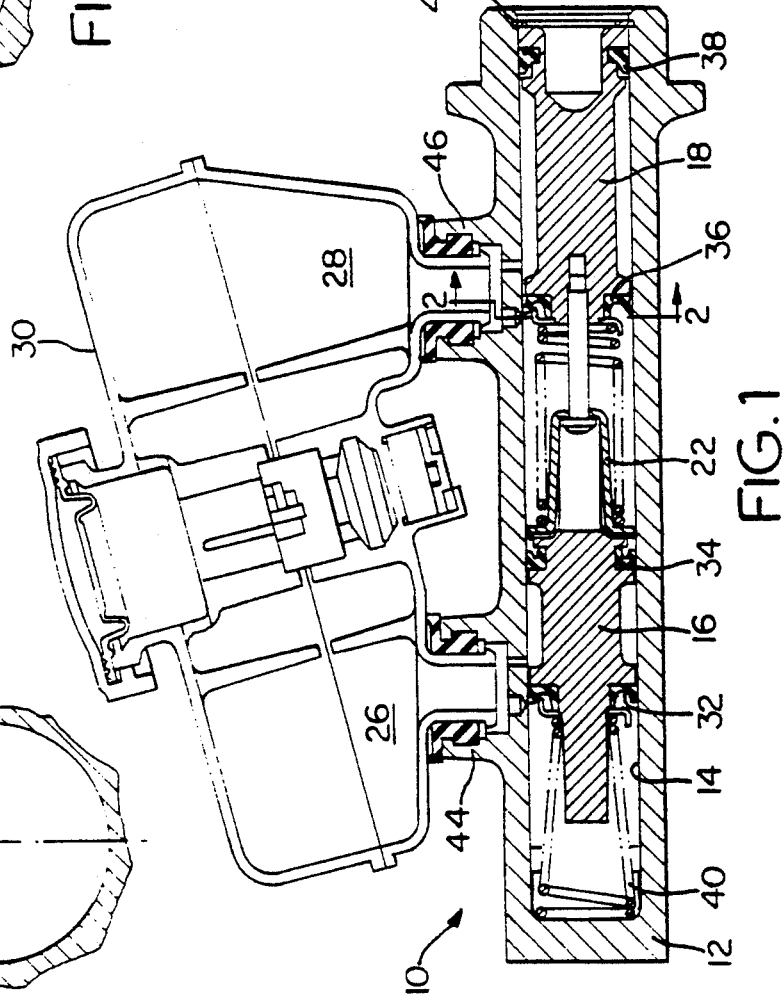

MASTER CYLINDER COMPENSATION PORTS

This invention relates to compensating ports for a master cylinder. The compensating ports have a plurality of openings through which fluid from a reservoir is rapidly communicated to an operational bore to maintain the fluid level in a bore in a full condition at all times.

In master cylinders, of which the structure disclosed in U.S. Pat. Nos. 3,646,759 and 3,677,606 is considered to be typical, communication of fluid between a reservoir and chambers in the bore of a housing is through compensation ports. Lip seals carried on operational pistons in the bore move past the compensation ports as the pistons move in response to an input force to thereafter pressurize fluid in the master cylinder and effect a corresponding brake application. Under some circumstances, pressurized fluid in the chambers may act on lip seals such that a portion of the lip seal is extruded into a compensation port.

Unfortunately, any subsequent movement of the pistons can thereafter result in the extruded portion of the lip seal being cut or damaged. A cut or damaged seal most often results in loss of pressurized fluid from the chamber which can thereafter effect the ability to adequately develop pressurized fluid required to effect an acceptable brake application. The problem caused by extrusion of lip seals into compensating ports has been overcome in master cylinders through the use of tilt valves of the type disclosed in U.S. Pat. No. 3,701,257, the use of fluid displacement pistons as disclosed in U.S. Pat. No. 4,249,381 and through center port compensation as disclosed in U.S. Pat. No. 5,161,375. The structure in such master cylinders to provide for compensation all perform in an adequate manner, however, there is considerable cost involved in the manufacture of such alternate compensation structure.

In the present invention, it has been determined that when a compensating port is made up of a plurality of openings which are sized to preclude extrusion of a lip seal into a reservoir, communication fluid between operational chambers and a reservoir can rapidly occur to maintain the fluid level in the bore in the full condition such that pulsing input forces may be applied to effect brake applications without a change in the resulting capability of the master cylinder.

In more particular detail, the master cylinder as disclosed herein has a housing with a bore having first and second pistons retained therein to define first and second chambers. The first and second chambers are connected to front and rear brake systems in a vehicle. The first and second chambers in the bore are connected to a reservoir through first and second compensation ports. First and second seals which are retained on the first and second pistons, respectively. The pistons in response to an input force, initially move the first and second seals past the first and second compensating ports and thereafter pressurize fluid in the first and second cheers. The resulting pressurizing fluid is supplied to the first and second brake systems to effect a brake application. On termination of the input force, return spring means move the first and second pistons toward a stop. As the first and second seals move past the plurality of holes in the compensating ports, fluid is rapidly communicated from the reservoir to replenish fluid in the first and second chambers to thereby maintain the fluid level in the brake systems in a full condition. The plurality of openings in the compensation ports allows fluid to rapidly flow into the first and second chambers to permit subsequent input forces to be applied to the first and second pistons to immediately pressurize fluid in the first and second chambers and effect a subsequent brake application.

The present invention provides structure which is simple and easy to manufacture and results in a master cylinder which functions to effect a plurality of brake applications in response to rapidly pulsed input forces to operating pistons in the master cylinder.

This and other advantages should be evident from reading the specification while viewing the drawings wherein:

FIG. 1 is a cross sectional schematic illustration of a master cylinder which incorporates the principles of the present invention;

FIG. 2 is an enlarged sectional view taken along lines 2—2 of FIG. 1;

FIG. 3 is an enlarged sectional view taken along lines 3—3 of FIG. 2;

FIG. 4 is an alternate embodiment of the compensation port of FIG. 3 showing the plurality of openings therein; and FIG. 5 is an alternate embodiment of the compensation port of a master cylinder showing top and bottom openings through which fluid is supplied to the operation bore.

The master cylinder 10 shown in FIG. 1 has a housing 12 with a bore 14 which retains a first piston 16 and a second piston 18. Lip seals 32 and 34 carried and retained on piston 16 and lip seals 36 and 38 carried and retained on piston 18 engage bore 14 to define first and second chambers 20 and 24 in master cylinder 10. A return spring 40 located in bore 14 acts on piston 16 to define the size of the first chamber 20 while a caged spring arrangement 22 acts on piston 18 to define the size of the second cheer 24. The first chamber 20 is connected to a front brake system while the second chamber 24 is connected to a rear brake system in a vehicle. The first chamber 20 is connected through compensation port 44 to a compartment 26 while the second chamber 24 is connected through compensation port 46 to a compartment 28 of a reservoir 30. Any input force sufficient to overcome the force of return spring 40 and caged spring arrangement 22, moves the first 16 and second 18 pistons away from stop 42 to pressurize fluid in cheers 20 and 24. As lip seal 32 on piston 16 moves past compensating port 44 and as lip seal 36 moves past compensation port 46 the fluid pressure in chambers increases as a function of the input force. This pressurized fluid is supplied co the first and second brake systems co effect a brake application. On termination of the input force, return spring 40 acts on piston 16 to move piston 18 against stop 42. As the first and second pistons 16 and 18 are moved toward stop 42 the fluid pressure in chambers 20 and 24 is rapidly reduced and as a result when seals 32 and 36 move past compensation ports 44 and 46, respectively, fluid is drawn into chambers 20 and 24. This replenishment of fluid into chambers 20 and 24 assures that the fluid level in bore 12 and the brake systems is in a full condition at all times.

The compensation ports 44 and 46 which is the subject of the present invention are identical and as a result only the structure of compensation port 46 will be fully described in detail hereafter. As best shown in FIGS. 2 and 3, compensation port 46 has a plurality of holes or openings 48, 50, and 52. The plurality of openings 48, 50 and 52 are aligned in a radial plane, as shown in FIG. 3, with the center hole or opening 50 located at the apex 15 of bore 14, as shown in FIG. 2. Openings 48 and 52 are located adjacent to and parallel with opening or hole 50 at an angle of 15° from the apex 15 of bore 14. The size or diameter of all of the openings 48, 50 and 52 is approximately 0.0625 cm which is sufficient to allow fluid communication between reservoir 30 and yet small enough to prevent extrusion of the lip seals into openings 48, 50 and 52 by fluid pressure in bore 14. When an input force is applied to initiate a brake application, piston 18 moves and lip seal 36 carried thereon simultaneously moves past all of the openings 48, 50 and 52 at the same time to begin pressurizing fluid in chamber 24. In this embodiment, pressurizing of fluid in bore 14 is substantially immediate as lost motion is limited to the diameter of openings 48, 50 and 52 in compensation ports 44 and 46. On termination of the input force, return spring 40 acting on piston 16 and caged spring arrangement 22 move piston 18 toward stop 42. When lip seal 32 moves past openings 48', 50' and 52' in compensation port 44 and lip seal 36 moves past openings 48, 50 and 52 in compensation port 46, fluid rapidly flows from reservoir 30 into chambers 20 and 24 to fill or replenish the fluid in the front and rear brake systems such that a subsequent input force may be immediately applied to piston 18 and effect a later brake application.

In the compensation port 146, shown in FIG. 4, the plurality of openings are aligned in different radial planes with first 100 and second 102 openings offset from a center opening 104. The first 100 and second 102 openings are designed to be about one half the size of the center opening and with this alignment, the first 100 and second 102 openings are the first to open to allow rapid fluid communication from reservoir 30 to bore 14 and the last to close during a brake application. This type of alignment under some operational conditions may provide for additional protection against extrusion of a lip seal by pressurized fluid to compensate for the additional lost motion that occurs to seal the bore to initiate pressurizing of fluid there during a brake application.

In the compensation port 246, shown in FIG. 5, the plurality of openings 200, 202, 204 and 206 are aligned to provide balanced forces across a lip seal. In this arrangement, fluid communication can occur at either the apex 215 or base 217 of bore 214 of the housing 212. Passage 210 in housing 212 freely communicates fluid from reservoir 230 to bore 214. When a return spring and caged spring arrangement move the operational pistons and lip seals carried thereon past openings 200, 202, 204 and 206 which are all in the same radial plane, fluid communication from a reservoir 230 is essentially unrestricted.

I claim:

1. In a master cylinder having a housing with a bore therein, first and second pistons located in said bore to define first and second chambers, respectively, said first and second chambers being connected to front and rear brake systems in a vehicle, said housing having first and second compensation ports for connecting said first and second chambers with a reservoir, first and second seals, respectively, retained on said first and second pistons, said first and second pistons responding to an initial input force by moving in said bore to initially move said first seal past first compensation port and said second seal past said second compensation port to thereafter pressurize fluid in said first and second chambers, said pressurizing fluid being supplied to said first and second brake systems to effect a brake application, return spring means for moving said first and second pistons toward a stop on termination of said input force to allow fluid to be communicated from said reservoir to said first and second chambers through said first and second compensation ports to maintain the fluid level in said front and rear brake systems in a full condition, said first and second compensation ports being characterized by a first plurality of openings aligned in a first radial plane and a second plurality of openings aligned in a second radial plane, said first plurality of openings having a first center hole with adjacent first and second holes, said second plurality of openings having a second center hole with adjacent first and second holes, said first and second plurality of openings allowing fluid to rapidly flow into said first and second chambers while said center holes and said first and second holes being of a size which precludes extrusion of said first and second seals into said first and second compensation ports by pressurized fluid to thereafter permit a later input force to immediately develop pressurized fluid for effecting a subsequent brake application.

2. In the master cylinder as recited in claim 1 wherein said first center hole is located at the apex of said bore and a first additional center hole is located in the same radial plane at the base of said bore to provide a balanced and smooth flow of fluid between said reservoir and first chamber; and said second center hole is located at the apex of said bore and a second additional center hole located in the same plane at the base of said bore to provide a balanced and smooth flow of fluid between said reservoir and second chamber.

3. In the master cylinder as recited in claim 1 wherein said first and second center holes are located at the apex of said radial planes of said bore and said first and second holes are within 15° from the tangent of the apex of said center hole.

4. In the master cylinder as recited in claim 3 wherein said center hole and first and second holes are identical in size.

5. In the master cylinder as recited in claim 4 wherein each central hole and said first and second holes has a diameter of approximately 0.0625 cm.

6. In a master cylinder having a housing with a bore therein, first and second pistons located in said bore to define first and second chambers, respectively, said first and second chambers being connected to front and rear brake systems in a vehicle, said housing having first and second compensation ports for connecting said first and second chambers with a reservoir, first and second seals, respectively, retained on said first and second pistons, said first and second pistons responding to an initial input force by moving in said bore to initially move said first seal past said first compensation port and said second seal past said second compensation port to thereafter pressurize fluid in said first and second chambers, said pressurizing fluid being supplied to said first and second brake systems to effect a brake application, return spring means for moving said first and second pistons toward a stop on termination of said input force to allow fluid to be communicated from said reservoir to said first and second chambers through said first and second compensation ports to maintain the fluid level in said front and rear brake systems in a full condition, said first and second compensation ports being characterized by a first plurality of openings having a first center hole with adjacent first and second holes and a second plurality of openings having a second center hole with adjacent first and second holes, said first and second plurality of openings allowing fluid to rapidly flow into said first and second chambers while said center holes and said first and second holes being of a size which precludes extrusion of said first and second seals into said first and second compensation ports by pressurized fluid to thereafter permit a later input force to immediately develop pressurized fluid for effecting a subsequent brake application, said first and second center holes being of the same size while said first and second holes are approximately one half the size of said first and second center hole and offset therefrom, said first and second holes being the last to engage said seal on movement of said piston in response to said initial input force and the first to engage the seal on movement of said piston toward said stop on termination of said initial input force, said force and second holes providing an initial flow path between said bore and reservoir to allow for a rapid replenishment of fluid on termination of said initial input force to maintain the fluid level in said front and rear brake systems in a full condition and thereby at provide a ready condition for a brake application in response to any subsequent input force.

7. In the master cylinder as recited in claim 6 wherein said first center hole is located at the apex of said bore and a first additional center hole is located in a same radial plane at the base of said bore to provide a balanced and smooth flow of fluid between said reservoir and first chamber; and said second center hole is located at the apex of said bore and a second additional center hole located is located in the same plane at the base of said bore to provide a balanced and smooth flow of fluid between said reservoir and second chamber.

8. In the master cylinder as recited in claim 6 wherein said first and second center holes are located at the apex of radial planes of said bore and said first and second holes are in the same plane within 15° from the tangent of the apex of said center hole.

* * * * *